United States Patent
Preetz et al.

(10) Patent No.: US 11,566,037 B2
(45) Date of Patent: Jan. 31, 2023

(54) PROCESS FOR PRODUCING ISOPROPYLIDENE BIS(CYCLOPENTADIENYL)ZIRCONIUM DICHLORIDE

(71) Applicant: LANXESS ORGANOMETALLICS GMBH, Bergkamen (DE)

(72) Inventors: Angelika Preetz, Dortmund (DE); Silvia Maus, Selm (DE)

(73) Assignee: LANXESS Organometallics GmbH, Bergkamen (DE)

( * ) Notice: Subject to any disclaimer, the term of this patent is extended or adjusted under 35 U.S.C. 154(b) by 576 days.

(21) Appl. No.: 16/492,758

(22) PCT Filed: Mar. 16, 2018

(86) PCT No.: PCT/EP2018/056684
§ 371 (c)(1),
(2) Date: Sep. 10, 2019

(87) PCT Pub. No.: WO2018/172212
PCT Pub. Date: Sep. 27, 2018

(65) Prior Publication Data
US 2020/0071348 A1    Mar. 5, 2020

(30) Foreign Application Priority Data
Mar. 20, 2017  (EP) ..................... 17161750

(51) Int. Cl.
C07F 17/00     (2006.01)
C08F 4/6592    (2006.01)
C08F 10/00     (2006.01)

(52) U.S. Cl.
CPC .......... C07F 17/00 (2013.01); C08F 4/65927 (2013.01); C08F 10/00 (2013.01)

(58) Field of Classification Search
CPC .............................. C07F 17/00; C08F 4/65927
See application file for complete search history.

(56) References Cited

U.S. PATENT DOCUMENTS

| | | |
|---|---|---|
| 4,404,344 A | 9/1983 | Sinn |
| 4,931,417 A | 6/1990 | Miya |
| 5,096,867 A | 3/1992 | Canich |
| 5,145,819 A | 9/1992 | Winter |
| 5,308,811 A | 5/1994 | Suga |
| 5,324,800 A | 6/1994 | Welborn, Jr. et al. |
| 5,688,735 A | 11/1997 | Ewen |
| 5,840,664 A | 11/1998 | Karol |
| 6,162,937 A | 12/2000 | Dang |
| 6,268,518 B1 | 7/2001 | Resconi |
| 2012/0040878 A1 | 2/2012 | Katayama |
| 2012/0065351 A1 | 3/2012 | Nozue |

FOREIGN PATENT DOCUMENTS

EP    0416815 A    8/1990

OTHER PUBLICATIONS

International Search Report WO2018172212 (dated Sep. 27, 2018).
I. E. Nifant'ev, V. L. Yarnikh, M. V. Borzov, B. A. Mazurchik, V. I. Mstyslavsky, V. A. Roznyatovsky, Y. A. Ustynyuk Organometallics 1991, 10, 3739-3745.
I. E. Nifant'ev, K.A. Butakov, Z. G. Aliev, I. F. Urazovskii Organometallic Chemistry in the USSR 4 (6) 1991, 622-624 (English translation of Metalloorganicheskaya Khimiya 4, 1991, 1265-1268).
I. E. Nifant'ev, B. V. Ivchenko, M. V. Borzov in Organometallic Chemistry in the USSR 5 (6) 1992, 673-674 (English translation of Metalloorganicheskaya Khimiya 5, 1992, 1371-1373).
Holger Frauenrath et al. pp. 14-19.
Thomas Koch et al. Organomettallics vol. 19, No. 13 pp. 2556-2563.
Nifant'ev, et al. vol. 16, No. 4,18 713-715, Feb. 18, 1997.
Alt H G et al. Journal of Organomettallic Chemistry, vol. 522, No. 1. Sep. 6, 1996, pp. 39-54.
J. Cadeans, L. D'Ornelas, L. J. et. al. vol. 19, No. 1 2004, pp. 79-88.
P. Kronig, M. Slongo, M. Neuenschwander in Makromol. Chem. 1982 (183) 359.
K. Black, H. C. Aspinall, A. C. Jones, K. Przybylak, J. Bacsa, P. R. Chalker, S. Taylor, C. Z. Zhao, S. D. Elliott, A. Zydord, P. N. Heys J. Mater. Chem. 2008 (18) 4561-4571.

*Primary Examiner* — Caixia Lu
(74) *Attorney, Agent, or Firm* — Nicanor A. Kohncke; Christopher L. McDavid; Ewa M. Wozniak

(57) ABSTRACT

The present invention describes a process for preparing isopropylidene bis(cyclopentadienyl)zirconium dichloride comprising the steps of: (a) reacting acetone and cyclopentadiene in the presence of sodium methoxide or sodium ethoxide so as to form 2,2-dicyclopentadienylpropane; and (b) reacting said 2,2-dicyclopentadienylpropane with zirconium(IV) chloride in the presence of n-butyl lithium so as to form isopropylidene bis(cyclopentadienyl) zirconium dichloride.

6 Claims, No Drawings

PROCESS FOR PRODUCING ISOPROPYLIDENE BIS(CYCLOPENTADIENYL)ZIRCONIUM DICHLORIDE

FIELD OF THE INVENTION

The present invention relates to an improved process for the preparation of isopropylidene bis(cyclopentadienyl) zirconium dichloride as well as to intermediates useful in the synthesis of said metallocene compound.

BACKGROUND OF THE INVENTION

The polymerization of olefins such as ethylene and propylene for manufacturing thermoplastics or norbornene-containing polymers often uses transition metal compounds, particularly metallocene compounds as a polymerization catalyst. Such polymerization catalysts have been diversely modified and studied over the last decades.

For example EP 0 035 242 A discloses a process for the polymerization of ethylene and propylene in the presence of a catalyst system comprising (a) a compound containing a transition metal such as cyclopentadienyl compound and (b) an aluminum containing of the aluminoxane type.

Furthermore, European patent application EP 0 129 368 A discloses a catalyst comprising (a) derivatives of mono, bi and tricyclopentadienyl coordinatinon complexes with a transition metal and (b) an alumoxane for preparing polyolefins of controlled molecular weight.

Also known are metallocene compounds using a substituted and unsubstituted cyclopentadienyl ligand system (EP 0 316 155 A), a substituted and unsubstituted indenyl ligand system (U.S. Pat. No. 5,840,664 A; EP 0 485 823 A) or a fluorine ligand system with heteroatom substituents (EP 0 577 581 A).

In addition, EP 0 416 815 A and U.S. Pat. No. 5,096,867 A disclose heteroatom substitution in mono-cyclopentadienyl metallocene useful for the polymerization of olefin.

However, there is continuous interest in producing metallocene compounds with high yield in a more effective way.

As is generally known in the art, bridged and substituted bis-cyclopentadienyl ligands are suitable for use as starting compounds in the process for producing a metallocene catalyst for the polymerization of olefin.

The traces of 2,2-dicyclopentadienylpropane to be used as a ligand have for the first time been observed by P. Kronig, M. Slongo, M. Neuenschwander in Makromol. Chem. 1982 (183) 359 in an attempt to polymerize 6,6-dimethylfulvene.

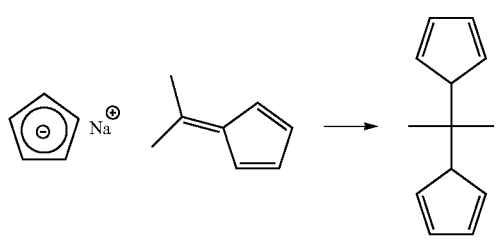

This approach was proven by I. E. Nifant'ev, B. V. Ivchenko, M. V. Borzov in Organometallic Chemistry in the USSR 5 (6) 1992, 673-674; Metalloorganicheskaya Khimiya 5, 1992, 1371-1373 using NaOH as a base catalyst and THF as the solvent yielding 82% of 2,2-dicyclopentadienylpropane.

EP 2 380 918 A also discloses a method for producing an a-olefin polymer suitable for use in a lubricating oil with the same route yielding 19% of 2,2-dicyclopentadienylpropane.

I. E. Nifant'ev, V. L. Yarnikh, M. V. Borzov, B. A. Mazurchik, V. I. Mstyslaysky, V. A. Roznyatovsky, Y. A. Ustynyuk Organometallics 1991, 10, 3739-3745. and I. E. Nifant'ev, K. A. Butakov, Z. G. Aliev, I. F. Urazovskii Organometallic Chemistry in the USSR 4 (6) 1991, 622-624; Metalloorganicheskaya Khimiya 4, 1991, 1265-1268 disclose a method involving a similar synthesis of 2,2-dicyclopentadienylpropane, however, with the aid of a phase transfer catalyst triethylbenzylammonium chloride (TEBA) in varying amounts yielding 58% and 85% isolated product respectively.

In addition, a metallation step as a next step yielding 35% and 39% of the isolated product has been reported by I. E. Nifant'ev, K. A. Butakov, Z. G. Aliev, I. F. Urazovskii in Organometallic Chemistry in the USSR 4 (6) 1991, 622-624; Metalloorganicheskaya Khimiya 4, 1991, 1265-1268 and K. Black, H. C. Aspinall, A. C. Jones, K. Przybylak, J. Bacsa, P. R. Chalker, S. Taylor, C. Z. Zhao, S. D. Elliott, A. Zydord, P. N. Heys J. Mater. Chem. 2008 (18) 4561-4571, respectively. The product was separated from LiCl by extraction from pentane and purified by subsequent recrystallization from pentane.

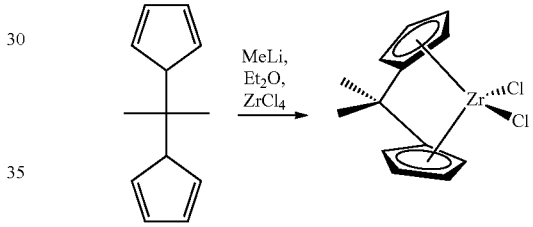

As described above, there have been many studies on metallocene compounds as a catalyst for producing olefin polymer and processes for producing the same. Despite the progress which has been described hitherto, there still is room left for improving a process for producing metallocene catalysts. In particular, in order to establish the synthesis route that can easily be scaled up, it is essential to have a reproducible synthesis route and process. Besides being reproducible a production process is sought that is efficient in the conversion of starting materials, in the usage of solvents and catalysts, and in the number of synthesis steps, i.e. a process that is economic.

SUMMARY OF THE INVENTION

As outlined above, the object of the present invention to be solved can be seen in providing an improved process for producing isopropylidene bis(cyclopentadienyl) zirconium dichloride.

The present invention provides a process for preparing isopropylidene bis(cyclopentadienyl)zirconium dichloride comprising the steps of:

(a) reacting acetone and cyclopentadiene in the presence of sodium methoxide or sodium ethoxide so as to form 2,2-dicyclopentadienylpropane; and (b) reacting said 2,2-dicyclopentadienylpropane with zirconium(IV) chloride in the presence of n-butyl lithium so as to form isopropylidene bis(cyclopentadienyl) zirconium dichloride.

Furthermore, the present invention provides use of isopropylidene bis(cyclopentadienyl) zirconium dichloride obtained according to the present invention as a catalyst in a polymerization of an olefin.

These and further features and advantages of the present invention will be apparent from the following detailed description and claims.

DETAILED DESCRIPTION OF THE INVENTION

The present invention is directed to a process for producing isopropylidene bis(cyclopentadienyl) zirconium dichloride.

Furthermore, the present invention provides a use of said isopropylidene bis(cyclopentadienyl) zirconium dichloride as a polymerization catalyst for olefins.

The process for producing isopropylidene bis(cyclopentadienyl) zirconium dichloride comprises a first step, wherein acetone and cyclopentadiene are reacted in the presence of sodium methoxide or sodium ethoxide so as to form 2,2-dicyclopentadienylpropane. Said 2,2-dicyclopentadienylpropane in a second step is reacted with zirconium (IV) chloride in the presence of n-butyl lithium so as to form isopropylidene bis(cyclopentadienyl) zirconium dichloride.

The reaction of the first reaction step can be summarized as follows:

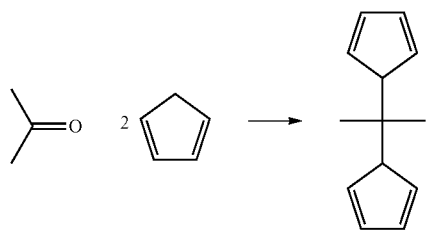

Furthermore, the reaction of the second step can be summarized as follows:

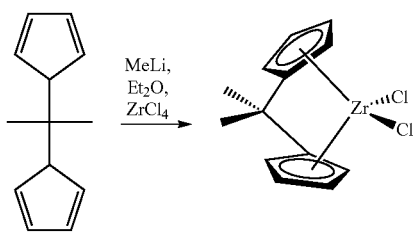

According to the present invention it was found that by using sodium methoxide or sodium ethoxide as a base in the first reaction step, the formation of the intermediate 2,2-dicyclopentadienylpropane can be achieved in much higher yield and in the absence of side products such as sodium cyclopentadiene, oxidation products of sodium cyclopentadiene or polymerization products, which are usually obtained when using sodium hydroxide as a base.

Especially, when using sodium hydroxide it was found that the yield of the intermediate 2,2-dicyclopentadienylpropane varied drastically and in some test reactions even did not produce any 2,2-dicyclopentadienylpropane product. Furthermore, when using sodium hydroxide it was difficult and/or cumbersome to remove the side products from the desired product, i.e., 2,2-dicyclopentadienylpropane.

Furthermore, according to the present invention it was found that when using dimethylformamide (DMF) as a solvent in the reaction of acetone and cyclopentadiene high product yields of 2,2-dicyclopentadienylpropane of for example more than 50% of isolated product, more preferably of more than 60% could be obtained.

In an even more preferred embodiment the reaction of acetone and cyclopentadiene is carried out by adding acetone to a reaction mixture comprising cyclopentadiene and DMF.

In an even more preferred embodiment the reaction of acetone and cyclopentadiene as described above is carried out at temperatures of 0 to 25° C., more preferably 10 to 20° C. for a time period of 30 minutes to 2 hours, more preferably 45 minutes to 1.5 hours.

After running this reaction, usually the reaction mixture is worked up for example by adding water so as to quench the reaction mixture, separate the organic phase by phase separation and washing the organic phase with water. Thereafter, usually the organic phase is dried for example by adding sodium sulfate ($Na_2SO_4$). Subsequently the organic phase may be subjected to a distillation step so as to purify the product 2,2-dicyclopentadienylpropane.

In a preferred embodiment prior to the isolation of the 2,2-dicyclopentadienylpropane product (for example prior to the distillation step) squalene may be added to the reaction mixture so as to stabilize the product for example during distillation (i.e., preventing polymerization of 2,2-dicyclopentadienylpropane).

However, according to the present invention there is no need for isolating the intermediate 2,2-dicyclopentadienylpropane, but the organic phase obtained in the first reaction step may be directly used in the second reaction after a change of the solvent used.

As shown above, according to the present invention thereafter the second reaction step (the "metallation") is carried out.

According to the present invention in the second step 2,2-dicyclopentadienylpropane is reacted with zirconium (IV) chloride in the presence of n-butyl lithium. In a preferred embodiment of the present invention said second reaction step is carried out by using tetrahydrofuran (THF), more preferably a mixture of THF and n-hexane as a solvent.

Usually said second reaction step is carried out by adding zirconium(IV) chloride to the intermediate 2,2-dicyclopentadienylpropane at temperatures of 0 to −20°, more preferably −5 to −15° C. for a time period of 15 minutes to 2 hours, more preferably 30 minutes to 1.5 hours.

According to the present invention furthermore it was surprisingly found that according to the present invention the two reaction steps outlined above can be carried out in a one-pot synthesis. Indeed, the present inventors found that high yields of the final product can be achieved by using THF in the second reaction step as the solvent because in said case the by-product LiCl formed in the second reaction step, does not have to be removed in an additional step, as it is soluble in THF whereas the product is not. Furthermore, according to the present invention the application of mutagenic tributyltin is not necessary and neither are very low temperatures of −78° C. or lower so as to obtain high product yields of for example more than 70%.

As known in the art, the polymerization yield of an olefin in the presence of a metallocene catalyst such as isopropylidene bis(cyclopentadienyl) zirconium dichloride, depends on the purity of the metallocene catalyst. When using isopropylidene bis(cyclopentadienyl) zirconium dichloride obtained according to the process claimed in the present invention, as metallocene catalyst in the polymerization of an olefin, surprisingly a high polymerization yield could be achieved.

According to a further aspect of the present invention isopropylidene bis(cyclopentadienyl) zirconium dichloride produced according to any one of the present invention, is used as a catalyst in a polymerization of an olefin.

EXAMPLES

1. Synthesis of 2,2-dicyclopentadienylpropane

All manipulations are carried out under inert gas atmosphere. A double wall reactor of 2 L volume is charged with DMF (600 mL), NaOMe (5.4 g, 0.1 mol) and cyclopentadiene Cp (132 g, 2.0 mol) at 20° C. The reactor is cooled to 15° C. Then, acetone (61 g, 1.05 mol) is added so that the reactor temperature remains below 20° C. After 1 h the reaction is complete (as judged by GC, 6,6-dimethylfulvene <1%). MTBE (300 mL) is added to the reaction mixture. Subsequently water (300 mL) is added to deactivate the reaction mixture. The two phases are separated and the organic phase is washed neutral with water (2×300 mL). The organic phase is dried over $Na_2SO_4$ and then MTBE and unconverted Cp are removed by vacuum distillation at room temperature. To the remaining crude product squalane (200 mL) is added and the product is purified by vacuum distillation (58° C., 0.3 mbar) yielding a colorless to slightly yellow liquid (94.4 g, 0.548 mol, 54.8% i.y.).

2. Preparation of Isopropylidene bis(cyclopentadienyl) zirconium Dichloride

All manipulations are carried out under inert gas atmosphere. In a double wall reactor of 2 L volume 2,2-dicyclopentadienylpropane (86.1 g, 0.5 mol) is dissolved in THF (1000 mL) and the mixture is cooled to −10° C. Within 90 min n-BuLi (23% solution in n-hexane, 278.5 g, 1.0 mol) are added between −10 and −5° C. The dilithium salt of the ligand precipitates. Within 30 min the suspension is warmed to room temperature and stirred at 25° C. for another 30 min. The, the solution is cooled to −5° C. and $ZrCl_4*2THF$ (188.6 g, 0.5 mol) is added. The addition is exothermic with a temperature increase of ca. 10 K. The reaction mixture is warmed to room temperature, then the mixture is refluxed (60° C.) for 90 min during which the product precipitates. Under normal pressure 35 to 45% of the solvent are removed. To complete crystallization of the product the reactor is cooled to −5° C. The product is separated by filtration and washed with THF to remove residual traces of LiCl. The product is dried in vacuum yielding 119.6 g (0.36 mol, 72% i.y) of fine light green crystals.

The invention claimed is:

1. Process for preparing isopropylidene bis(cyclopentadienyl)zirconium dichloride comprising the steps of:
   (a) reacting acetone and cyclopentadiene in the presence of sodium methoxide or sodium ethoxide so as to form 2,2-dicyclopentadienylpropane; and
   (b) reacting said 2,2-dicyclopentadienylpropane with zirconium(IV) chloride in the presence of n-butyl lithium so as to form isopropylidene bis(cyclopentadienyl) zirconium dichloride.

2. The process according to claim 1, wherein dimethylformamide (DMF) is used as a solvent in the reaction of acetone and cyclopentadiene in the presence of sodium methoxide or sodium ethoxide.

3. The process according to claim 1 or 2, wherein the reaction (a) is carried out at a temperature of 10 to 20° C. for a time period of 45 minutes to 1.5 hours.

4. The process according to claim 1, wherein said reaction (b) is carried out in a mixture of THF and n-hexane as a solvent.

5. The process according to claim 1, wherein said reaction (b) is carried out at a temperature of −5 to −15° C. for a time period of 30 minutes to 1.5 hours.

6. The process according to claim 1 wherein 2,2-dicyclopentadienylpropane obtained in reaction (a) is isolated prior to being used in reaction (b).

* * * * *